United States Patent [19]

Gebhardt

[11] Patent Number: 4,821,114
[45] Date of Patent: Apr. 11, 1989

[54] OPTO-ELECTRONIC SCANNING ARRANGEMENT

[75] Inventor: Axel Gebhardt, Mönkeberg, Fed. Rep. of Germany

[73] Assignee: Dr. Ing. Rudolf Hell GmbH, Fed. Rep. of Germany

[21] Appl. No.: 44,609

[22] Filed: May 1, 1987

[30] Foreign Application Priority Data

May 2, 1986 [DE] Fed. Rep. of Germany ....... 3614888

[51] Int. Cl.$^4$ .......................... H04N 1/46; H04N 1/028
[52] U.S. Cl. ........................................ 358/75; 358/901; 350/96.25
[58] Field of Search ................ 358/75, 285, 293, 294, 358/901; 350/96.14, 96.18, 96.24, 96.25, 96.28

[56] References Cited

U.S. PATENT DOCUMENTS

| | | | |
|---|---|---|---|
| 4,154,500 | 5/1979 | Funato et al. | 350/96.25 |
| 4,278,995 | 7/1981 | Fearnside et al. | 358/54 |
| 4,409,477 | 10/1983 | Carl | 350/96.24 |
| 4,490,740 | 12/1984 | Moriguchi | 358/75 |
| 4,560,235 | 12/1985 | Servaes et al. | 350/96.24 |

Primary Examiner—James J. Groody
Assistant Examiner—Robert M. Bauer

[57] ABSTRACT

An opto-electronic arrangement for line-by-line scanning of color originals in reproduction technology by means of photodiodes as the opto-electronic transducers characterized by a light source with a condenser system whose light is projected at a fiber-optical shape converter, whose output cross section forms a linear optical pattern which is focussed further by a cylindrical lens into a band shape onto the original. In one embodiment, a filter wheel is provided between the light source and shape converter and in another embodiment the photodiodes are provided with dichroitic filters for selecting the color of the light received from the original into desired colored patterns. In another modification, the first cylindrical lens focusses the light onto a diffusing element and then a second cylindrical lens is present for focussing the light from the diffusing element directly onto the original. The light from the original is preferably received either by a macrolens and focussed onto the row of photodiodes or is received by a GRIN fiber optical arrangement for directing the light onto the photodiodes.

25 Claims, 5 Drawing Sheets

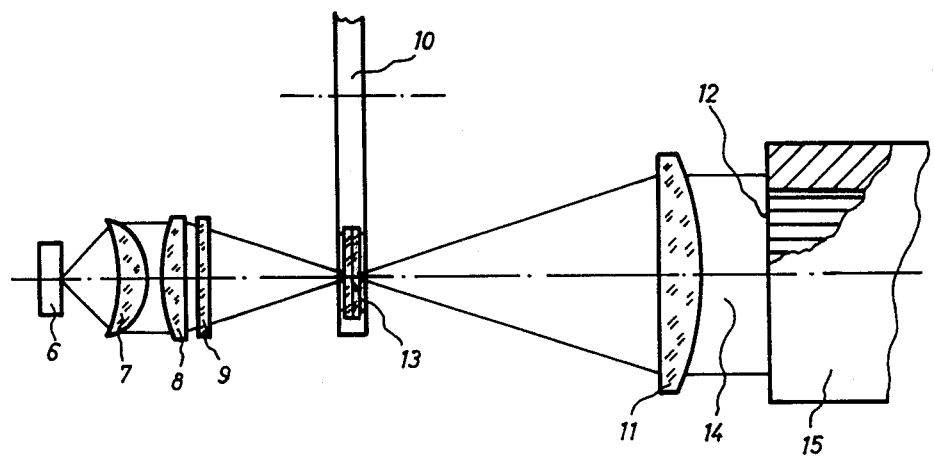
*Fig. 2*
*Fig. 3a*
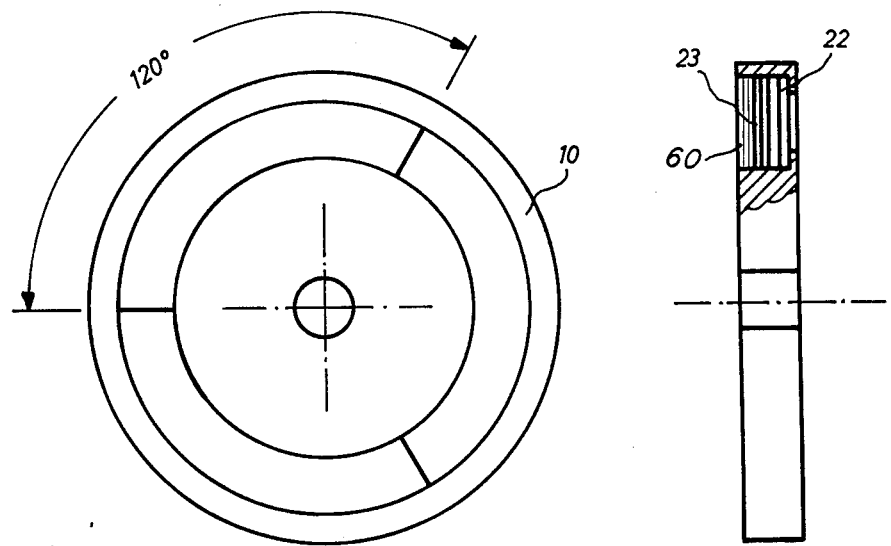
*Fig. 3b*

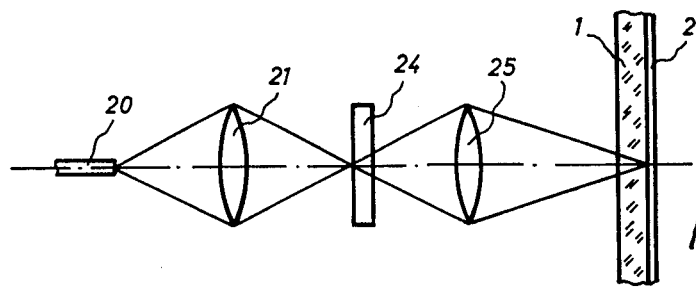
Fig. 4a
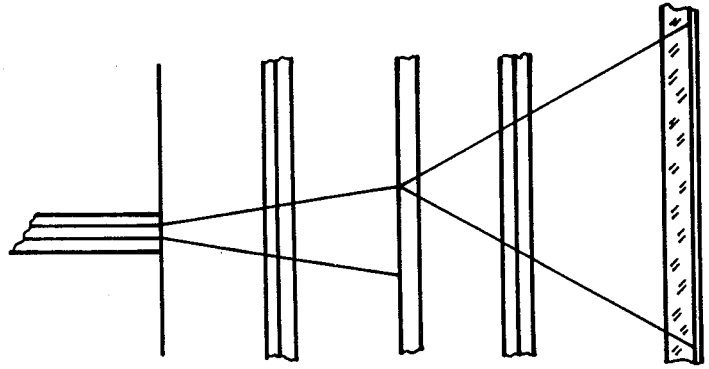
Fig. 4b
Fig. 5b
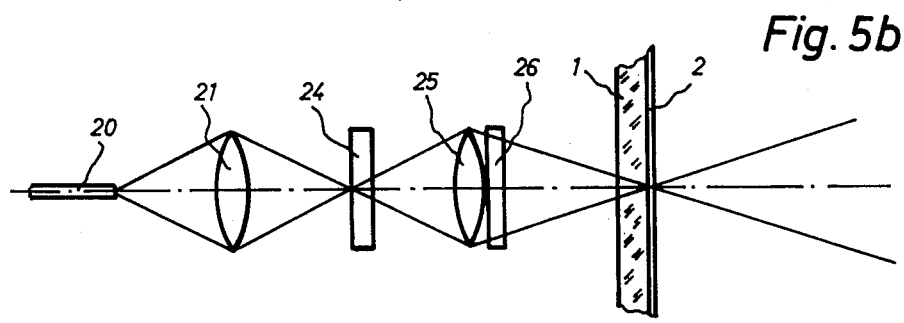
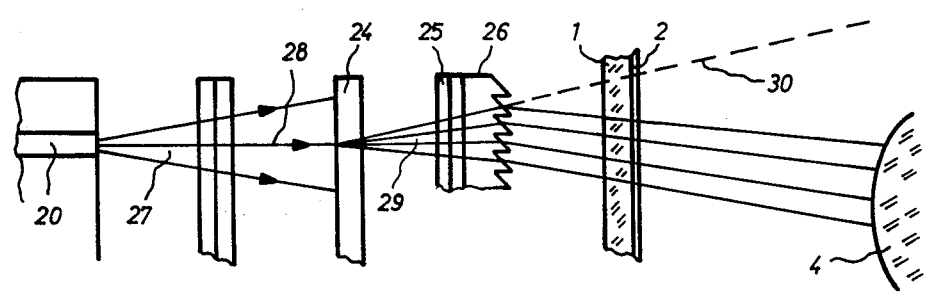
Fig. 5a

OPTO-ELECTRONIC SCANNING ARRANGEMENT

BACKGROUND OF THE INVENTION

The present invention is directed to an opto-electronic arrangement for a line-by-line scanning of color originals in reproduction technology. The arrangement includes a light source, a shaped transducer whose output is constructed to provide a linear optical pattern or light band which corresponds to the line to be scanned, a filter means and a line of photodiodes. The filter means will contain filters which are set for color separation of the light of the light source into individual colors, for example, red, green or blue.

Luminophore tubes are presently often employed in reproduction technology as linear light sources for scanning originals. In addition, a surface illumination is employed in scanning originals in combination with the movement of a CCD line in a feed direction.

These illumination arrangements have the disadvantage that the optical efficiency is low and that they are not suited for illuminating the original line-by-line with chromatic light.

U.S. Pat. No. 4,490,740, whose disclosure is incorporated by reference thereto, discloses an arrangement for multi-color scanning of originals comprising a stationary original stage, a light pick-up and an illumination unit including a rotating filter wheel for generating the multi-color scan light. The light passes through the filter wheel and is converted into a line-shaped optical pattern or light band by means of a fiber-optical shape transducer of the illumination unit. This band shape pattern is then conducted across the original. The light reflected from the original will proceed via a deflecting mirror in an optical arrangement onto a line of photodiodes. Both the illumination unit of the filter wheel and the shape transducer, as well as the light pick-up which comprises the deflecting mirror, optics and a line of photodiodes are moved under the stage supporting the original and are moved along the original for scanning the original. This has the disadvantage that the fiber-optical shape transducer is moved and, thus, bent so that it disadvantageously changes its optical transmission properties and that all non-uniformities in the overall motion sequence, as well as jolts, produce image disturbances.

The arrangement of this patent also has the further disadvantage that it has poor light efficiency and that, in addition, the intensity distribution of the light at the output of the optical pattern or light band formed by the fibers is nonuniform. The poor efficiency results occur because the light at the output of the individual fiber optics will diverge. The different intensity distribution is caused by the different properties of the individual fibers and leads to streaking in the reproduction. The intensity distribution additionally changes due to the motion of the fiber-optical transducer so that a further deterioration of the image quality will occur.

SUMMARY OF THE INVENTION

The object of the present invention is to create an illumination arrangement or lightband for a CCD color scanning which enables high illuminance in the entire visible part of the spectrum and enables a uniform illumination onto the original. Moreover, a black-white reproduction of color originals which is correct in terms of tonal gradation is also obtainable and desired.

These objects are achieved in an improvement in an optical-electronic arrangement for a line-by-line scanning of a color original in a reproduction technology by means of opto-electrical transducers comprising a line of photodiodes, a light source means for creating a beam of light having a luminance flux, a shape converter of optical fibers positioned between the means and original and having an input end and an output end with a fiber arrangement to form a linear light pattern or light band which corresponds to the line to be scanned, and filter means for filtering light before it reaches the diode and being either a filter wheel being interposed between the light source and the shape converter or being positioned before the photodiodes which receive the light from the original. The improvements are that the light source means is a white source, which includes a condensor system for focusing the light beams with a bundle of light, wherein the input of the fiber-optical shape converter is provided with a shape at the input end which is matched to the cross section of the incoming light bundle, at least one cylindrical lens extends over the full length of the linear fiber arrangement and is being arranged in the divergent luminance flux emerging from the linear fiber arrangement so that the divergent luminance flux is converted into a line-shaped light strip directed onto the original to be scanned and optical means, such as either GRIN fiber optics or a macrolens, is provided for receiving the light from the original, whether it is transmitted through the translucent original or reflected from an opaque original and directs this to the line of photodiodes. In those arrangements wherein the light is directed onto the original without passing through the filter but the light from the original is then passed through a filter, the improvements include the condenser lens system focusing the light bundle onto the input side of the shape converter instead of throughout the filter means and the filter means being positioned between the optical means and line of photodiodes. In the embodiment where the light is filtered before being directed at the original, the filter means is positioned between the light source means and the input end of the shape transducer.

Other advantages and objects of the present invention will be readily apparent from the following description, drawings and claims.

BRIEF DESCRIPTION OF THE DRAWINGS

FIG. 1b is a plan view of the scanning device of FIG. 1a;

FIG. 2 is a schematic view similar to FIG. 1a with portions broken away for purpose of illustration illustrating a lamp housing of the scanning device;

FIG. 3a is a side view with portions broken away of a color filter wheel in accordance with the present invention;

FIG. 3b is a plan view of the filter wheel of FIG. 3a;

FIG. 4a is a side view schematically presenting the beam path of light from the end of a optical converter to the original;

FIG. 4b is a plan view of the beam path of FIG. 4a;

FIG. 5a is a plan view schematically illustrating another embodiment for a beam path from an optical converter to the original;

FIG. 5b is a side view of the beam path of FIG. 5a;

FIG. 7 is a schematic view of a modification of the arrangement FIG. 1a.

DESCRIPTION OF PREFERRED EMBODIMENTS

Figure 1A:
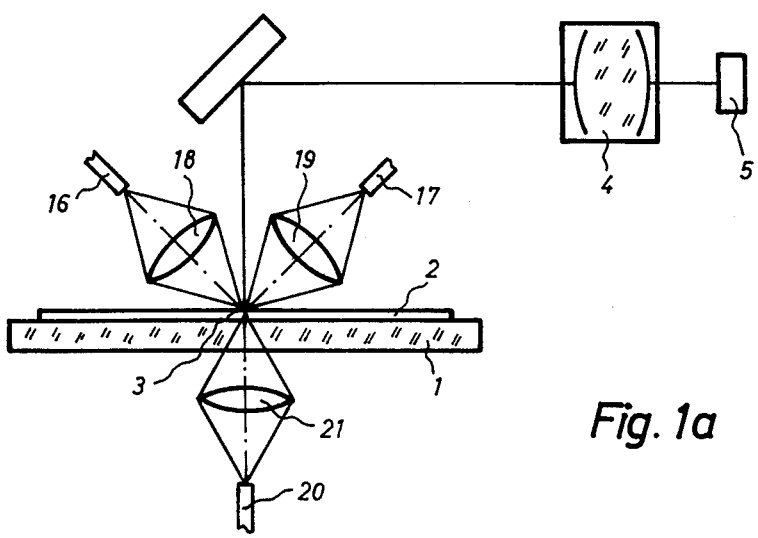
FIG. 1a is a schematic side view of a scanning device for originals having a CCD scan line.
Figure 1B:
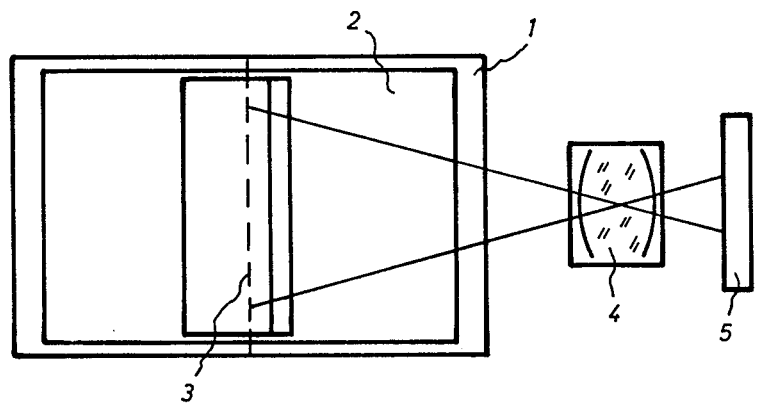

The scanning arrangement or scanner of FIGS. 1a and 1b comprises a stage or support 1 for an original 2. The stage 1, which is made of a transparent material, is movable in a feed direction and accepts either transparent originals 2 or opaque originals 2.

As may be seen from FIG. 1a, the original 2 to be scanned is illuminated with an optical pattern or light band 3 which has a width of about 1 mm and is imaged onto a CCD line 5 by optical means such as a macrolens 4.

Figure 1C:
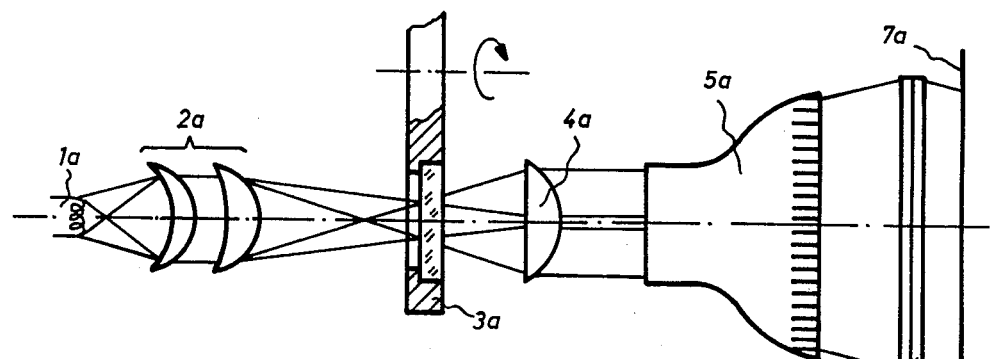
FIG. 1c is a plan view with portions broken away for purpose of illustration schematically illustrating a light path from a source in accordance with the present invention through a filter, a shape converter and onto an original.
Figure 1D:
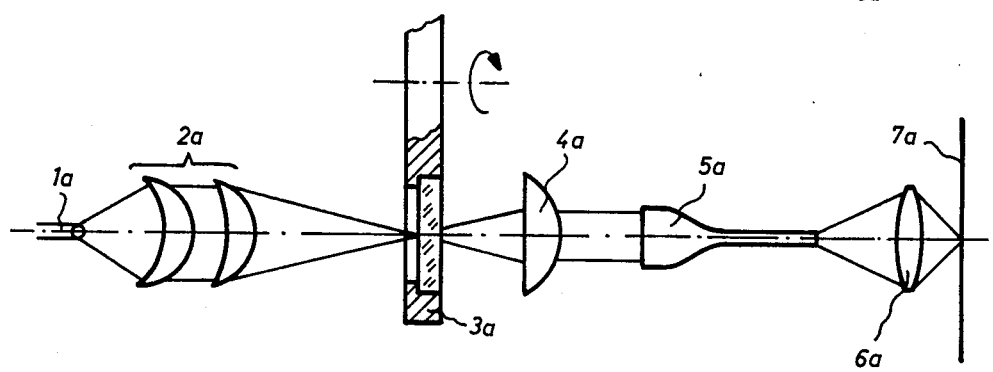
FIG. 1d is a side view of the arrangement of FIG. 1c.

As illustrated in FIGS. 1c and 1d, the light source for generating the optical pattern or light band 3 is illustrated as a halogen lamp 1a and includes a shape transducer or a converter 5a. The transducer is made up of a plurality of optical fibers which gather into a circular cross section at an input end and are spread out into a flat portion at an output end.

The halogen lamp 1a, for example, can be an OSRAM 12 V - 50 W and generates white light. A condenser system 2a is positioned to received the light from the lamp 1a and focusses the filament image onto a filter wheel 3a which contains interference filters as well as containing intensity mass changing filters for generating the primary colors, red, green and blue. This imaging of the filament onto the filter is especially advantageous because a high efficiency of the filter wheel will be achieved. The light leaving the filter wheel is collimated by a lens 4a into a bundle having a round cross secting and onto an entrance end of a shape transducer or converter 5a which will convert incoming light from a circular bundle into a line shape band. An additional improvement of the efficiency will occur here due to the adaptation of the entrance cross section of the fiber-optical shape transducer converter to the cross section of the bundle from the lens 4a. The fiber discharge of the shape converter will form a line which is imaged onto the original 7a that is to be illuminated by means of a cylindrical lens 6a so that a line-shaped optical pattern or band will occur. Because of the filter passing different primary colors, a cyclical illumination of the original with the primary colors will occur as a consequence of this arrangement. Both opaque and transparent illumination is possible, for example, see FIG. 4a.

Instead of utilizing a halogen lamp, the light source can be a Zenon lamp and a tuneable acousto-optical filter can be employed instead of the filter wheel.

Given the scanning arrangement in accordance with FIGS. 1a–1d, for example, for high-resolution scanners, a one-dimensional CCD line is currently advantageously employed. The linear CCD lines are available having up to 5000 pixel length, whereas two-dimensional CCD arrays are adapted to the video standard, for example a Fairchild CCD 211, which has an array of 488×380 pixels.

As already mentioned, a fiber-optical shape transducer or converter can be advantageously utilized for the illumination arrangement set forth hereinabove because proceeding on the basis of a punctiform light source, which may be either a halogen lamp or a xenon arc lamp, a line-shaped light band or pattern can be generated. The light of the point light source can be cyclically switched in a simple way with color filters and one manages it with only one CCD line in a scanning color picture. The optical efficiency is considerably greater, given line-by-line illumination in comparison to surface illumination and the signal-to-noise ratio, which includes influence of stray light, is improved in comparison to surface illumination and corrections of non-uniformity of the illumination dependent on the image location, for example edge drop of the illumination, and vignetting of the scanning lens are less involved than in the two-dimensional arrangement.

As advantageously shown in FIG. 2, the illumination arrangement can be composed of a lamp housing having a light source 6, a condenser system including lenses 7 and 8, and an IR-absorbing filter 9. The light from the filter 9 goes through a filter of the color filter wheel 10 to a collimator lens 11 which forwards the light onto the entrance cross section of the input end of the shape converter 15 whose entrance cross section is adapted to the diameter of the light bundle 14 being formed by the collimator 11. For reasons of optical light exploitation, the lamp housing can be constructed in mirro-symmetry relative to the light source 6 in order to simultaneously illuminate two fiber-optical shape converters 15.

Due to the condenser formed by the lenses 7 and 8 having a stop number S of about 1 and due to the intermediate imaging 13, the lamp filament of the light source 6 is enlarged about three times on the color filter wheel. The collimation lens alone will collimate the light so that the light bundle 14 comprises uniform luminance and slightly overfills an entrance face 12 of the shape converter or transducer 15.

The entrance face 12 of the shape converter can differ in size dependent on the length of the scan lines, whether they are opaque or transparent. On the basis of the selection of the focal length of the collimator lens 11, the diameter of the bundle 14 can be matched to the diameter of the shape converter.

Figure 6:
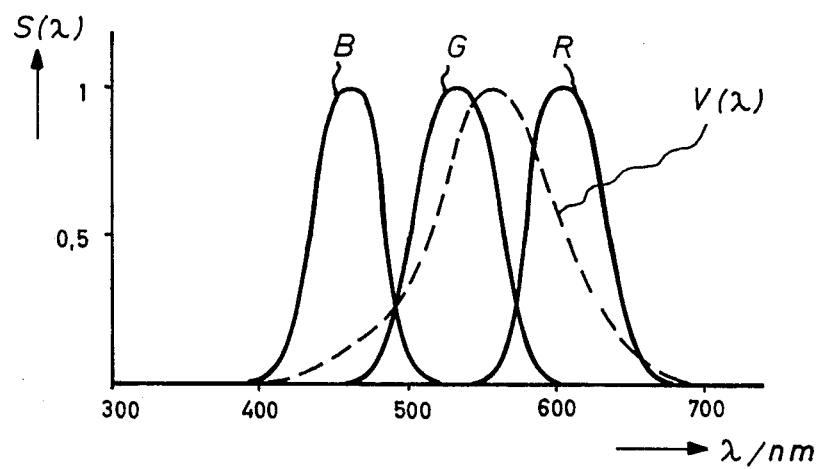
FIG. 6 is a graphic illustration of the spectral sensitivity curves for red, green, blue and visible light.

The color wheel 10 of FIGS. 3a and 3b is composed of three sectors of 120° each minus the mounting edges for the filters. The filter wheel sectors contain dichroitic filters 22 which are for red, green and blue and additional mass filters, a color glass 23 with which the overall spectral sensitivity can be adapted to a known scanning curve. Instead of the red, green and blue filter for the wheel 10, a visual spectrum filter $V(\lambda)$ can be utilized for color reproduction suitable to tonal gradations. The curves of these filters are shown in FIG. 6 and discussed hereinafter.

In FIG. 1a, both an opaque as well as transparency mode of illumination as original is illustrated. The opaque illumination is realized by two shape converters, whose fiber discharges or output ends are 16 and 17 and illuminate the original by means of a cylindrical lens 18 and 19, with lens 18 arranged with the end 16 and lens 19 arranged with the end 17. If the original 2 is an opaque illumination as mentioned hereinabove, the beam path of the cylindrical lens is symmetrical, i.e., the optical fiber discharges or output end are imaged onto the original in a 1:1 ratio. The optical length of the cylindrical lens can, preferably, be f=10 mm. Given employment of acrylic monofibers having a fiber diameter of 0.75 mm for the shape converter, a light band or optical pattern having a width of about 1 mm will occur.

In transparency illumination, the beam path of the transparent illumination comes from an output end 20 of the converter through a cylindrical lens 21 and is likewise symmetrical. However, only one shape converter is utilized.

As illustrated in FIGS. 4a and 4b the improvement of the invention for transparency illumination is by means of a two-stage imaging. In order to reduce disturbing non-uniformities of the luminance of the scan line, the fiber line or output end 20 of the transducer is preferably initially imaged onto a diffusing screen 24 by means of a first cylindrical lens 21. The diffusing screen is in turn advantageously imaged onto the original 2 by a second cylindrical lens 25.

An embodiment illustrated in FIGS. 5a and 5b utilizes the introduction of a field lens. Given large field angles, the picture brightness decreases toward the edge of the picture due to the vignetting of the scan lens and due to illumination. This drop in brightness at the image edge can be compensated by a field lens, for example, a Fresnel cylindrical lens 26. As illustrated in FIG. 5a, the beam path from the light conductors 20 of the transducer extend with beam rays 27. A single ray 28 from this bundle of rays 27 is illustrated as being diffused into a second bundle 29 by the diffusing screen 24. This bundle is focussed onto the original 2 by the cylindrical lens 25 and is simultaneously deflected towards the pupil of a scanning optics 4 by a Fresnel cylindrical lens 26. Without the Fresnel lens 26, the single beam 30 would miss the pupil of the scanning optic and this would produce a reduction of the image brightness at the picture edge. As one can also see, a broad strip of the original is illuminated by a single light conductor. Thus, an overlap of the original and averaging the brightness of a greater number of light conductors will occur. This leads to a more uniform illumination within the scanning line.

As mentioned above, the filter curves $S(\lambda)$ for the acquisition of the spectral red, green and blue components from a white light of the source. In accordance with the invention, a matching of the filter curves to the sensitivity curve of the CCD line has been undertaken in accordance with the invention. The dichroitic filters, which are standard in color scanning, are employed for the red, green and blue wavelengths, and these have mass filters, i.e., colored glass, which are connected parallel to them for correcting the filter curve. In order to correct the amplitude of the red, green and blue curves to identical height, a neutral filter 60 (FIG. 3a) can be additionally connected parallel as needed and usually is a standard grey glass being utilized for this purpose.

In black-white reproduction of colored originals, a single filter having a characteristic which corresponds to the eye's sensitivity can be utilized instead of color filters. This curve is also referenced as a visual spectrum curve $V(\lambda)$ curve and is likewise shown in FIG. 6. This filter curve course is designed so that the reproduction of black and white occurs correctly in terms of tonal gradation.

A great advantage of the scanning arrangement of the invention is that one makes due with one CCD line and that this need not be moved except that the filter wheel, and no other optical parts must be moved. Moreover, this arrangement enables an extremely uniform line illumination even at the edge of the line give high light yields, i.e., a high efficiency. Both color as well as black and white reproduction is possible in both opaque as well as transparent scanning. Even scanning of large originals in one apparatus is possible. Of course these functions can also be individually realized in an apparatus when an apparatus is required only for one type of scanning or reproduction. Another advantage is in the manufacturing of the device, since the same optical unit can be employed for these various applications.

Figure 7:
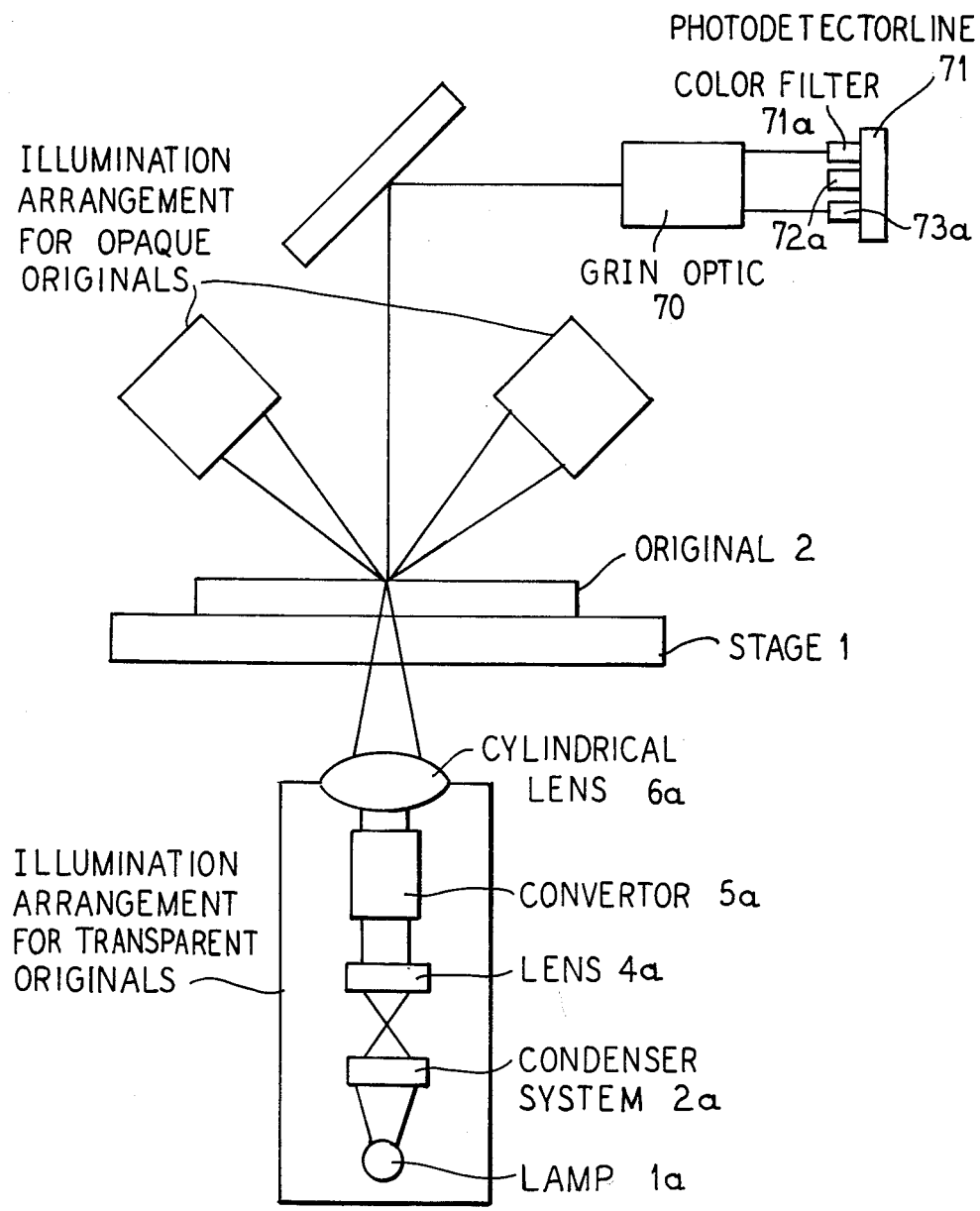

In this context, yet another modification of the invention is of significance, namely that a GRIN fiber optic 70(FIG. 7) is employed in conjunction with the photodiode line instead of the macrolens 4(FIG. 1a) This photodiode line comprises the length of the scanning line. Such a GRIN fiber optic is disclosed, for example, an article from *Photonics Spectra*, Dec. 1982, pp. 59–62. An extremely compact structure becomes possible on the basis of this arrangement.

Given employment of a photodiode line 71(FIG. 7) which already undertake a color separation themselves given illumination with a white light, the filter wheel can be omitted. In these photodiode line a plurality of photodiodes are allocated to every pixel or picture element, and these photodiodes supply the desired color signal by being preceded by corresponding dichroitic filters 71a, 72a, 73a.

Although various minor modifications may be suggested by those versed in the art, it should be understood that I wish to embody within the scope of the patent granted hereon all such modifications as reasonably and properly come within the scope of my contribution to the art.

I claim:

1. In an opto-electronic arrangement for a line-by-line scanning of color originals and reproduction technology by means of a line of photodiodes as an opto-electronic transducer, a light source means for creating a beam of light directed to the original and received by a photodetector, filters being arranged before the photodetectors for separating the light into a plurality of colors, and a shape converter of optical fibers being positioned between the original and the light source and having an input end for receiving the light beam from the source and an output end with the fibers being arranged to form a linear fiber arrangement to direct the light in a line at the line to be scanned the improvements comprising the light source means being a point shape white light source, a condenser system being arranged to receive the light beam from the light source and form the beam into a light bundle directed onto an input end of the shape converter, the input end of the converter being fashioned to have an entrance cross section adapted to the cross section of the light bundle from the condenser system, at least one cylindrical lens extending the full length of the linear fiber arrangement of the output end of the shape converter and being arranged in the output end of the converter to receive the light from the output end of the converter and to convert it into a line-shaped light strip directed at the colored original and optical means being provided for forming light from the original to impinge on the filter means.

2. In an opto-electronic arrangement according to claim 1, wherein the light source is selected from a group consisting of halogen lamps and Xenon lamps.

3. In an opto-electronic arrangement according to claim 1, wherein the filter includes a V(Lambda) filter for true color tone rendoring.

4. In an opto-electronic arrangement according to claim 1, wherein the colored original is an opaque original and said arrangement includes two illumination arrangements for projecting light onto the original in two directions with an angle of 45° between said two directions, each direction forming a scan line coinciding on said original.

5. In an opto-electronic arrangement according to claim 1, which includes a diffuser disk being arranged to receive the light focussed by the cylindrical lens, a second cylindrical lens for focussing the light from the diffuser disk onto the original.

6. In an opto-electronic arrangement according to claim 5, which includes a Fresnal lens being arranged adjacent the second cylindrical lens.

7. In an opto-electronic arrangement according to claim 1, wherein the photodiode line comprises the length of the scan line and the optical means includes GRIN fiber optics.

8. In an opto-electronic arrangement according to claim 1, wherein the optical means comprises a macrolens.

9. In an opto-electronic scanning arrangement for line-by-line scanning of color originals in electronic color reproduction technology by means of a line of photodiodes as an opto-electronic transducer having a plurality of filters arranged before said line of photodiodes for separating incoming light into a plurality of colors, said scanning arrangement including a light source means for generating a light bundle, a shape converter of optical fibers being arranged in front of the color original and having a light input end for receiving light and a light output end with an elongated cross section to form a linear pattern on a line of said color original to be scanned, the improvement comprising the light source means being a point-shaped white light source, a condensor system being arranged after said white light source for forming an intermediate image of said white light source, a collimator system being arranged between said condensor system and said shape converter to match the cross section of the light bundle to the cross section of the light input end of said shape converter, whereby a homogeneous illumination of said light input end is achieved, at least one cylindrical lens being arranged between the light output end and said color original and extending over the length of the elongated light output end of said converter to convert the light pattern from said light output end into a line-shaped light strip having a homogeneous light distribution, said light strip being directed onto said color original to illuminate the scan line of said color original, and optical means being arranged between the color original and said filters of the line of photodiodes for receiving light from the color original and focussing it onto said filters.

10. In an opto-electronic scanning arrangement according to claim 9, wherein the white light source is selected from a group consisting of halogen lamps and Xenon lamps.

11. In an opto-electronic scanning arrangement according to claim 9, wherein the color original is an opaque color original and the arrangement includes two shape converters with an associated cylindrical lens being arranged to direct two bands of light on two axes on the same portion of the original at an angle of approximately 45° between the two axes.

12. In an opto-electronic scanning arrangement according to claim 9, wherein the color original is a transparent color original, and the arrangement further includes a second cylindrical lens and a diffusing means, said diffusing means being positioned at the focal point of the first mentioned cylindrical lens and the second cylindrical lens being positioned to focus light passing through the diffusing means into said light strip on the color original.

13. In an opto-electronic scanning arrangement according to claim 12, which includes a Fresnel lens being arranged adjacent to the second cylindrical lens.

14. In an opto-electronic scanning arrangement according to claim 9, wherein the length of the line of photodiodes is equal to the length of a scan line of the color original and wherein said optical means comprise a GRIN optical fiber.

15. In an opto-electronic scanning arrangement according to claim 9, wherein said optical means comprise a macro-lens.

16. In an opto-electronic scanning arrangement for line-by-line scanning of color originals in electronic color reproduction technology by means of a line of photodiodes as an opto-electronic transducer, said scanning arrangement including a light source means for generating a light bundle, a filter wheel which comprises a plurality of filters for separating the light bundle into a plurality of colors, a shape converter of optical fibers being positioned between said filter wheel and said color original and having a light input end for receiving light and a light output end with an elongated cross section to form a linear light pattern on a line of said color original to be scanned, the improvement comprising the light source means being a point-shaped white light source, a condensor system being arranged between said white light source and said filter wheel for focussing the light beam of the white light source onto said filter wheel so as to form an intermediate image of said white light source on said filter wheel, a collimator system being arranged between said filter wheel and said shape converter to match the cross section of the light bundle to the cross section of the light input end of said shape converter, whereby a homogeneous illumination of said light input end is achieved, at least one cylindrical lens being arranged between the light output end of said shape converter and said color original and extending over the length of said elongated light output end of said shape converter to convert the light pattern from said light output end into a line-shaped light strip having a homogeneous light distribution said light strip being directed onto said color original to illuminate the scan line of said color original, and optical means being arranged between said color original and said line of photodiodes for receiving light from the color original and focussing it onto said line of photodiodes.

17. In an opto-electronic scanning arrangement according to claim 16, wherein the filter wheel is a rotating filter wheel.

18. In an opto-electronic scanning arrangement according to claim 16, wherein the filter wheel includes a visual spectrum filter having V (λ)-characteristic for use in black and white reproduction of color originals.

19. In an opto-electronic scanning arrangement according to claim 16, wherein the color original is an opaque color original and the arrangement includes two shape converters with an associated cylindrical lens being arranged to direct two bands of light on two axes on the same portion of the original at an angle of approximately 45° between the two axes.

20. In an opto-electronic scanning arrangement according to claim 16, wherein the color original is a transparent color original, and the arrangement further includes a second cylindrical lens and a diffusing means, said diffusing means being positioned at the focal point of the first mentioned cylindrical lens and the second cylindrical lens being positioned to focus light passing through the diffusing means into said light strip on the color original.

21. In an opto-electronic scanning arrangement according to claim 20, which includes a Fresnel lens being arranged adjacent to the second cylindrical lens.

22. In an opto-electronic scanning arrangement according to claim 21, wherein the filter wheel includes filter sets, each set being composed of a dichroic filter for color separation, one or more colored glasses and a gray glass, wherein the filter and glasses are adapted to that for a white or transparent original all signals generated by said line of photodiodes have the same signal amplitudes.

23. In an opto-electronic scanning arrangement according to claim 16, wherein the length of the line of photodiodes is equal to the length of a scan line of the color original and wherein said optical means comprise a GRIN optical fiber.

24. In an opto-electronic scanning arrangement according to claim 16, wherein said optical means comprise a macro-lens.

25. In an opto-electronic arrangement according to claim 16, wherein the white light source is selected from a group consisting of halogen lamps and Xenon lamps.

* * * * *